United States Patent
Ebara et al.

(10) Patent No.: US 7,066,245 B2
(45) Date of Patent: Jun. 27, 2006

(54) ON-VEHICLE AIR-CONDITIONER FOR AIR-CONDITIONING

(75) Inventors: Toshiyuki Ebara, Osaka (JP); Hirokazu Izaki, Osaka (JP); Tetsuya Masuda, Osaka (JP); Kazuaki Mizukami, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 166 days.

(21) Appl. No.: 10/258,084

(22) PCT Filed: Feb. 12, 2002

(86) PCT No.: PCT/JP02/01154

§ 371 (c)(1),
(2), (4) Date: Nov. 25, 2002

(87) PCT Pub. No.: WO02/064388

PCT Pub. Date: Aug. 22, 2002

(65) Prior Publication Data

US 2004/0069481 A1    Apr. 15, 2004

(30) Foreign Application Priority Data

Feb. 13, 2001    (JP) ............................... 2001-35994

(51) Int. Cl.
 *B60H 1/00*    (2006.01)
(52) U.S. Cl. .................. 165/202; 165/121; 62/244
(58) Field of Classification Search ............. 165/41, 165/42, 43, 202, 203, 121; 62/244
See application file for complete search history.

(56) References Cited

U.S. PATENT DOCUMENTS

| 1,528,575 | A | * | 3/1925 | Schill ............................ 165/41 |
| 1,660,145 | A | * | 2/1928 | Winans ......................... 165/41 |
| 1,660,146 | A | * | 2/1928 | Winans ......................... 165/41 |
| 3,823,568 | A | * | 7/1974 | Bijasiewicz et al. .......... 62/244 |
| 3,881,546 | A | * | 5/1975 | Otsuka et al. ................ 165/42 |

(Continued)

FOREIGN PATENT DOCUMENTS

DE    19629114    1/1998

(Continued)

OTHER PUBLICATIONS

* CD-ROM of the specification and drawings annexed to the request of Japanese Utility Model Application No. 4455/1993 (Laid-open No. 64076/1994) (Japan Climate Systems Corp.), Sep. 9, 2004, (Family: none).

*Primary Examiner*—Ljiljana Ciric
(74) *Attorney, Agent, or Firm*—Weingarten, Schurgin, Gagnebin & Lebovici KKP

(57) ABSTRACT

An on-vehicle air-conditioner for air-conditioning has a refrigeration circuit provided with a refrigerant car exterior heat exchanger installed for exchanging heat with the car exterior air that can be used for cooling and for heating, and at least one opening and closing duct for air inflow rate regulation installed in front of and/or behind the refrigerant car exterior heat exchanger. By controlling the opening/closing of the duct according to the situation, the arrangement can solve problems of the prior art, and can efficiently and sufficiently perform cooling, heating, defrosting or the like. The arrangement is useful even when using, for example, $CO_2$ as a refrigerant, in vehicles such as hybrid cars using electricity and gasoline as their energy source, idle stop coping cars or the like.

12 Claims, 4 Drawing Sheets

U.S. PATENT DOCUMENTS

| | | | |
|---|---|---|---|
| 4,383,642 A * | 5/1983 | Sumikawa et al. | 165/42 |
| 4,539,943 A * | 9/1985 | Tsuchikawa et al. | 123/41.05 |
| 4,586,652 A * | 5/1986 | Sakurai | 165/43 |
| 4,665,971 A * | 5/1987 | Sakurai | 165/203 |
| 4,949,553 A * | 8/1990 | Suzuki | 165/42 |
| 5,014,911 A * | 5/1991 | Vincent | 165/42 |
| 5,016,704 A * | 5/1991 | Ono | 165/203 |
| 5,284,025 A | 2/1994 | Kajitani et al. | |
| 5,615,491 A * | 4/1997 | Bae | 165/43 |
| 5,878,806 A * | 3/1999 | Denk et al. | 165/42 |
| 6,206,092 B1 * | 3/2001 | Beck et al. | 165/203 |
| 6,422,309 B1 * | 7/2002 | Vincent | 165/204 |
| 6,488,077 B1 * | 12/2002 | Arold | 165/42 |
| 6,761,210 B1 * | 7/2004 | Arold | 165/43 |
| 6,823,935 B1 * | 11/2004 | Arold | 165/202 |

FOREIGN PATENT DOCUMENTS

| | | |
|---|---|---|
| EP | 0179304 | 4/1986 |
| EP | 0356716 | 3/1990 |
| JP | 61-8574 A | 1/1986 |
| JP | 6322214 | 2/1988 |
| JP | 2241819 | 9/1990 |
| JP | 5-238248 A | 9/1993 |
| JP | 5-238249 A | 9/1993 |
| JP | 5-319077 A | 12/1993 |
| JP | 7-55296 A | 3/1995 |
| JP | 7055296 | 3/1995 |
| JP | 11-198637 A | 7/1999 |
| JP | 11198637 | 7/1999 |
| JP | 11-301254 A | 11/1999 |

* cited by examiner

ON-VEHICLE AIR-CONDITIONER FOR AIR-CONDITIONING

FIELD OF THE INVENTION

The present invention concerns an on-vehicle air-conditioner for air-conditioning used for vehicles such as hybrid cars using electricity and gasoline as their energy source, idle stop coping cars, or the like.

BACKGROUND ART

Ordinary vehicles travel by taking the power out of an internal combustion engine using gasoline as fuel. Such vehicles have an on-board refrigeration circuit provided with a compressor driven by the internal combustion engine. Cooling is performed by evaporating refrigerant in an evaporator, and cooling the car interior air by the generated cold heat.

In addition, heating is performed by heating the car interior air with the heat of the cooling water used for cooling the engine.

Nonetheless, as such vehicles obtain power for driving through the combustion of gasoline or the like, the control or regulation of hazardous materials contained in the exhaust gas from the combustion has come to be zealously desired.

Moreover, conventionally, a refrigerant for cooling and refrigeration apparatus, for instance, chlorodifluoromethane (R22, boiling point 140.8° C.) or the like, has been used. However, R22 or the like have become the object of fluorine regulation, because they destroy the ozone layer by their high latency of ozone destruction, when they are released in the atmosphere and attain the ozone layer in the upper air of the Earth.

The destruction of this ozone layer is provoked by a chlorine group (Cl) in the refrigerant. Therefore, refrigerants not containing a chlorine group, for example, alternative refrigerants such as difluoromethane (HFC-32, R32, boiling point −52° C.) or the like, have been proposed; however, they have ended up being included in gases to be regulated by The 3rd Session of the Conference of the Parties to the United Nations Framework Convention on Climate Change, Kyoto, 1997, because their Global Warming Potential (GWP) is 1300 to 1900, and their use has come to be difficult.

Given this trend of attaching importance to the environment, hydrocarbon system refrigerants such as propane, butane, i-butane, pentane, i-pentane, and natural refrigerants such as $CO_2$ or others existing in the natural world and imposing less load to the environment have attracted attention, because they are free from an ozone layer destruction effect, combustibility or toxicity. Furthermore, they are extremely friendly to the environment, as their global warming potential (GWP) is 1, and in addition, they are economical.

Therefore, it has been proposed to use $CO_2$ as a refrigerant for hybrid cars and idle stop coping cars that use electricity and gasoline as their energy source, or other vehicles, to perform the cooling by loading a refrigeration circuit provided with a compressor driven by electricity, and to perform the heating, on the other hand, by using the heat of the chilled water that is used to cool the engine.

FIG. 6 shows the composition of an on-vehicle air-conditioner for air-conditioning of the prior art, having, as necessary components, a refrigeration circuit 10, a cooling water circuit 20, and a damper apparatus 30 for controlling the flow of the car interior air.

The cooling water circuit 20 has a cooling water car exterior heat exchanger 21, also called a radiator, installed exterior to or outside of the car interior or passenger cabin, through which the cooling water circulates in order to cool an engine (not shown) such as an internal combustion engine. The cooling water circuit also has a cooling water car interior heat exchanger 22 installed at the car interior or passenger cabin side for exchanging heat between the car interior air and the cooling water, and a pump 23 for circulating cooling water among them, or the like.

The refrigeration circuit 10 is provided with a compressor 11 driven by an electric motor disposed in a closed vessel (not shown), a gas cooler (sometimes designated as a refrigerant car exterior heat exchanger) 12 for cooling the refrigerant compressed to a high pressure by the compressor 11, an expansion valve 13 for expanding the cooled refrigerant, an evaporator 14 for generating cold heat by vaporizing the refrigerant, a four-way valve 15 for flowing the refrigerant in the direction shown by the continuous line in the drawing or in the direction shown by the broken line, through switching-over.

In case of cooling by means of the refrigeration circuit 10, the four-way valve 15 is set to circulate the refrigerant as shown by the continuous line arrow. In this case, the refrigerant sucked by the compressor 11 is compressed to a high pressure, and the refrigerant compressed to the high pressure is cooled by the gas cooler 12 (refrigerant car exterior heat exchanger). The cooled refrigerant is then vaporized by the evaporator 14 via the expansion valve 13 for generating cold heat, and thereafter, sucked again by the compressor 11 via the four-way valve 15. The car interior air is delivered to the evaporator 14 by a fan (not shown), whereby the refrigerant exchanges heat with the car interior air, evaporates and returns to the compressor 11. As the heat for the evaporation of the refrigerant is transferred from the car interior air, the temperature of the car interior air is lowered by as much, thereby cooling the car interior.

It should be appreciated that, at this time, if the car interior air that has exchanged heat with the evaporator 14 is sent to the cooling water car interior heat exchanger 22, the temperature of the car interior air once cooled then elevates. Therefore, a damper apparatus 30 is moved to the position shown by the continuous line in order to prevent the car interior air from being sent to the cooling water car interior heat exchanger 22.

On the other hand, during the heating operation, the four-way valve 15 is set to circulate the refrigerant as shown by the broken line arrow. In this case, the refrigerant sucked by the compressor 11 is compressed to a high pressure, and the refrigerant compressed to the high pressure is sent to the evaporator 14 via the four-way valve 15. The refrigerant is then cooled using this evaporator 14 as a gas cooler. The cooled refrigerant is sent to the gas cooler 12 via the expansion valve 13. The refrigerant is vaporized using this gas cooler 12 as an evaporator (refrigerant car exterior heat exchanger) for generating cold heat, and thereafter, sucked again by the compressor 11 via the four-way valve 15. The car interior air is sent to the evaporator 14 used as a gas cooler by a fan (not shown), whereby the refrigerant exchanges heat with the car interior air to cool. As the heat during the refrigeration of the refrigerant is transferred to the car interior air, the temperature of the car interior air is elevated by as much, and the car interior is heated. Additionally, the pump 23 is driven at the same time as the vehicle is driven to circulate the cooling water, and heating by the cooling water circuit 20 is performed simultaneously.

By setting the damper apparatus 30 at the dashed line position, the car interior air is sent by a fan (not shown) and heated by the evaporator 14 used as a gas cooler. The heated car interior air is sent to the cooling water car interior heat exchanger 22 and heated again for performing the heating. Nonetheless, when the refrigeration circuit of such on-vehicle air-conditioner is used for heating during travel in winter or the like, frosting occurs on the refrigerant car exterior heat exchanger 12, and the performance of the refrigerant car exterior heat exchanger 12 deteriorates. Therefore, a defrosting operation is performed; however, there is a problem in that the defrosting can not be realized easily, because air at low temperature flows into the refrigerant car exterior heat exchanger.

In addition, when the refrigeration circuit of such an on-vehicle air-conditioner is used for cooling during traffic congestion during high temperature in summer or the like, there is a problem in that the cooling efficiency of the refrigerant car exterior heat exchanger 12 deteriorates due to the radiation heat of drivers such as the engine, motor or the like and the flow of hot air from one's vehicle, or the exhaust heat or the like of vehicles traveling ahead. The refrigerant ends up being cooled insufficiently, and the car interior cooling becomes unsatisfactorily.

Also, when the refrigeration circuit is used for cooling during summer or the like, in a vehicle having on board such on-vehicle air-conditioner for air-conditioning, there is a problem in that the cooling efficiency of the refrigerant car exterior heat exchanger 12 deteriorates and the refrigerant ends up being cooled insufficiently, if the refrigerant car exterior heat exchanger 12 is exposed to direct sunlight, and the car interior cooling becomes unsatisfactorily.

It is an object of the present invention to provide an on-vehicle air-conditioner for air-conditioning that can solve problems of the prior art, and perform effectively cooling, heating, defrosting or the like, even in the case of using, for example, $CO_2$ as a refrigerant, in vehicles such as hybrid cars using electricity and gasoline as their energy source, idle stop coping cars or the like.

DISCLOSURE OF THE INVENTION

The Inventors have studied diligently to solve problems of the prior art, and have found that defrosting can be realized by installing at least one opening and closing duct for regulating the air inflow rate in front of or behind the refrigerant car exterior heat exchanger 12 and controlling conveniently the opening/closing thereof according to the situation, in short by preventing cold air from flowing in the refrigerant car exterior heat exchanger 12. The car interior can be cooled sufficiently by preventing hot air from flowing so much in the refrigerant car exterior heat exchanger 12 during traffic congestion during a hot summer or the like and at the same time by blocking off the radiation heat of drivers such as the engine, motor or the like and the flow of hot air from one's vehicle, the exhaust heat of vehicles traveling ahead, or the like. And the car interior can be cooled sufficiently by preventing the refrigerant car exterior heat exchanger 12 from being exposed to direct sunshine. Thereby, the Inventors came to realize the present invention.

In short, the on-vehicle air-conditioner for air-conditioning of the present invention is an on-vehicle air-conditioner for air-conditioning comprising:

a refrigeration circuit provided with a refrigerant car exterior heat exchanger installed for exchanging heat with the car exterior air that can be used for cooling and for heating, and at least one opening and closing duct for air inflow rate regulation installed in front of and/or behind the refrigerant car exterior heat exchanger.

In another embodiment of the present invention, at least one of the ducts installed in front of and/or behind the refrigerant car exterior heat exchanger is controlled to close, for defrosting frost deposited on the refrigerant car exterior heat exchanger by using the refrigeration circuit for heating during travel in winter or the like.

In yet another embodiment of the present invention, at least one of the ducts installed in front of and/or behind the refrigerant car exterior heat exchanger is controlled to close, and the air used for cooling the engine, motor or motor driving circuit, which has increased in temperature, is sent, by lowering the speed of rotation through reverse rotation of a fan, through the refrigerant car exterior heat exchanger, for defrosting frost deposited on the refrigerant car exterior heat exchanger by using the refrigeration circuit for heating during travel in winter or the like.

In still another embodiment of the present invention, at least one of the ducts installed in front of and/or behind the refrigerant car exterior heat exchanger is controlled to close, and the fan is stopped, for defrosting frost deposited on the refrigerant car exterior heat exchanger by using the refrigeration circuit for heating during travel in winter or the like.

In a further embodiment of the present invention, at least one of the ducts installed in front of and/or behind the refrigerant car exterior heat exchanger is controlled to be half-open, during use of the refrigeration circuit for cooling during traffic congestion during high temperatures in summer or the like.

In a still further embodiment of the present invention, at least one of the ducts installed in front of and/or behind the refrigerant car exterior heat exchanger is controlled to be half-open, in the case where direct sunshine adversely affects the heat exchange of the refrigerant car exterior heat exchanger, during use of the refrigeration circuit for cooling.

In any embodiment of the on-vehicle air-conditioner for air-conditioning of the present invention, the refrigerant can be $CO_2$.

In any embodiment of the on-vehicle air-conditioner for air-conditioning of the present invention, the refrigerant can be a hydrocarbon system refrigerant.

10 indicates a refrigeration circuit, 11 a compressor, 12 a gas cooler (refrigerant car exterior heat exchanger), 13 an expansion valve, 14 an evaporator, 15 a four-way valve, 20 a refrigeration circuit, 21 a cooling water car exterior heat exchanger, 22 a cooling water car interior heat exchanger, 23 a pump, 30 a damper apparatus, 40 a vehicle, 41 an engine, 42 a fan, 43 a first opening and closing duct for air inflow rate regulation, 44 a second opening and closing duct for air inflow rate regulation, 45 a base material, 46 a movable louver, 47 a take-up machine, and 48 a wire for opening regulation.

BEST MODE FOR CARRYING OUT THE INVENTION

Now, embodiments of the present invention are described in detail using drawings.

Figure 1:
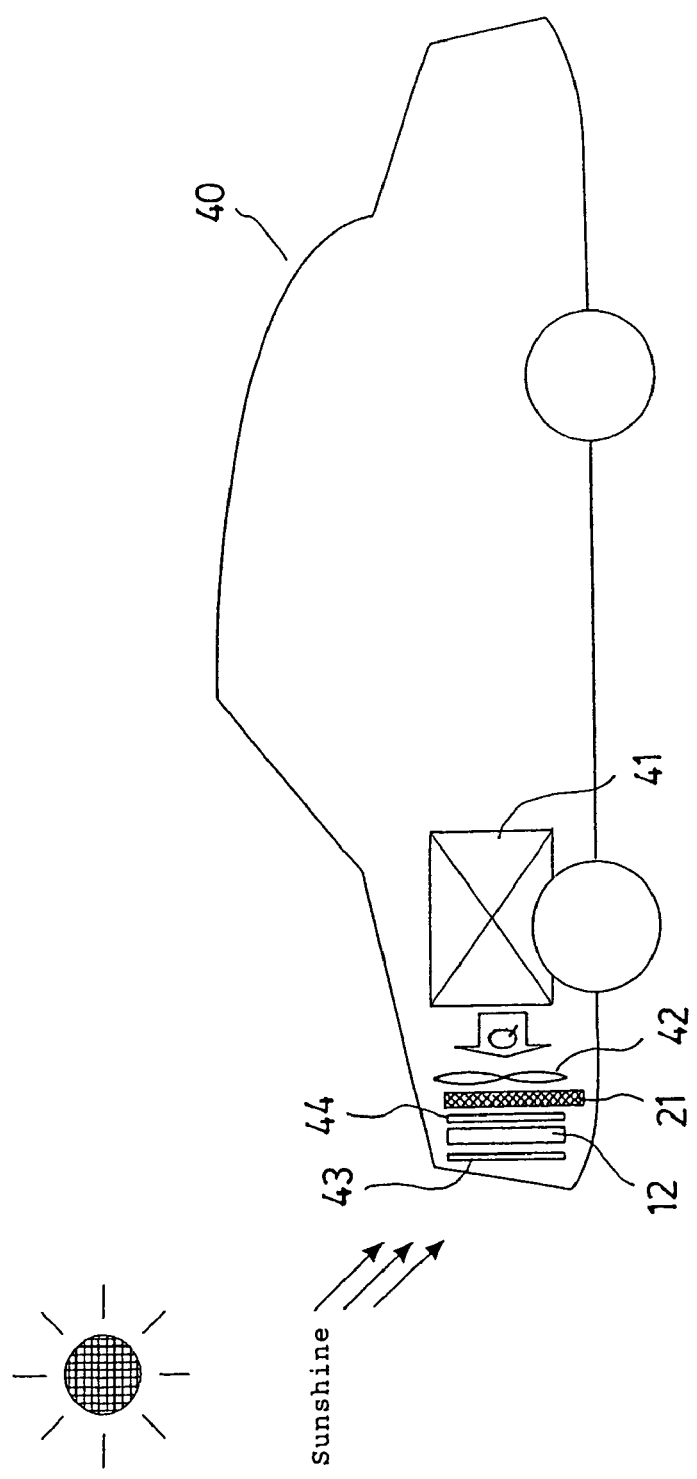
FIG. 1 is an illustrative drawing for schematically describing one embodiment of a vehicle having on board an on-vehicle air-conditioner for air-conditioning of the present invention.

FIG. 1 is an illustrative drawing for schematically describing one embodiment of a vehicle having on board an on-vehicle air-conditioner for air-conditioning of the present invention.

FIGS. 2 to 5 are illustrative drawings for schematically describing shape examples and use examples of an opening and closing duct for air inflow rate regulation used in the present invention.

In FIG. 1, 40 represents a vehicle having on board an on-vehicle air-conditioner for air-conditioning a car interior or passenger cabin of the present invention, 41 an engine and 42 a fan or the like. A refrigerant car exterior heat exchanger 12 provided in the on-vehicle air-conditioner for air-conditioning of the present invention is installed in front of the vehicle 40, within a shell of the vehicle, and exterior to or outside of the passenger cabin. A cooling water car exterior heat exchanger 21 designated as a so-called radiator through which cooling water circulates in order to cool the engine 41, is installed behind the heat exchanger 12. In addition, a first opening and closing duct for air inflow rate regulation 43 is fitted in front of and adjacent to the refrigerant car exterior heat exchanger 12, and a second opening and closing duct for air inflow rate regulation 44 is fitted behind and adjacent to the refrigerant car exterior heat exchanger 12.

In the present invention, as shown in the example of FIG. 1, the first opening and closing duct for air inflow rate regulation 43 and the second opening and closing duct for air inflow rate regulation 44 may be fitted; however, the first opening and closing duct for air inflow rate regulation 43 may be alone, the second opening and closing duct for air inflow rate regulation 44 may be alone, and they may be conveniently selected and fitted.

The opening and closing duct for air inflow rate regulation 43 (opening and closing duct for air inflow rate regulation 44 may also be of the same composition as 43) includes a base material 45, a number of movable louvers 46 mounted on the base metal 45, a take-up machine 47 disposed at one end of the base metal 45, a wire for opening regulation 48 linked to the take-up machine 47, or the like. The air inflow rate can be adjusted through the rotation of the movable louvers 46 by winding up the wire for opening regulation 48 or, on the contrary, by unwinding the wire for opening regulation 48, through the automatic or manual operation of the take-up machine.

The material and the shape of the base material 45 or movable louvers 46, or the moving method of the movable louvers 46 are not specified particularly.

As a material for the base material 45 or movable louvers 46, not only metals such as aluminum, but also, for example, engineering plastic materials presenting light weight, good strength, heat resistance, heat insulation or others can be used advantageously.

Figure 2:
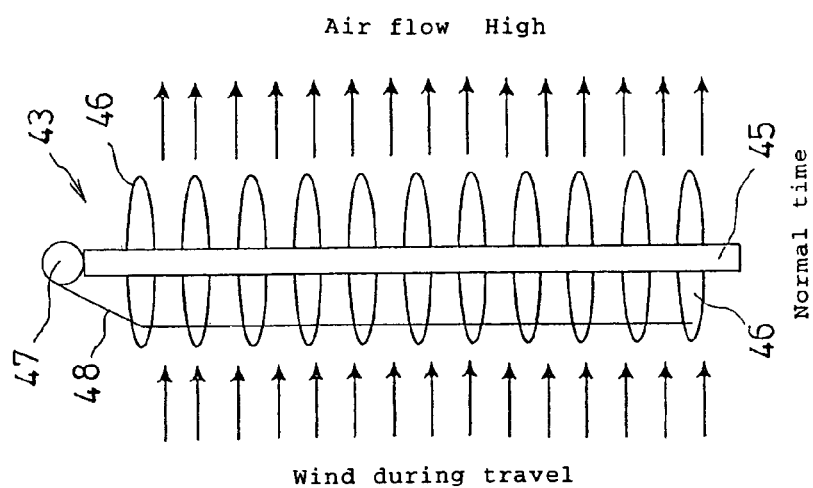
FIG. 2 is an illustrative drawing for schematically describing a shape example and a use example of an opening and closing duct for air inflow rate regulation used in the present invention.

As shown in FIG. 2, normally, it is preferable to increase the air inflow rate by positioning the movable louvers 46 of the opening and closing duct for air inflow rate regulation 43 and the opening and closing duct for air inflow rate regulation 44 approximately at right angles to the base material 45.

Figure 3:
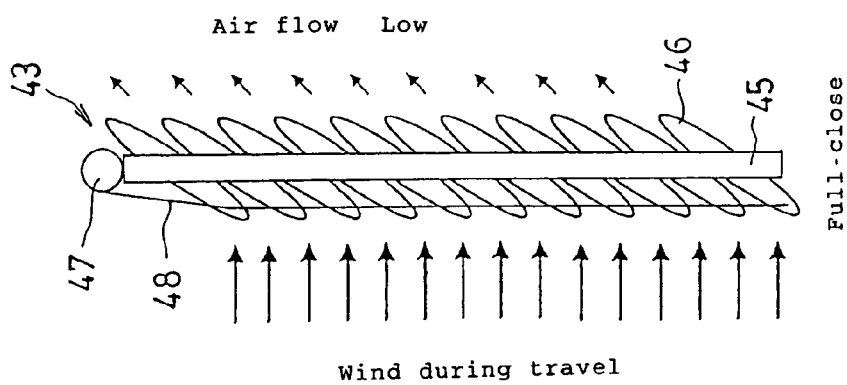
FIG. 3 is an illustrative drawing for schematically describing another use example of the opening and closing duct for air inflow rate regulation used in the present invention shown in FIG. 2.

Then, frosting may sometimes happen on the refrigerant car exterior heat exchanger 12, when the refrigeration circuit is used for heating during travel of the vehicle 40 in winter or the like. Therefore, the air inflow rate is reduced by positioning the movable louvers 46 of the first opening and closing duct for air inflow rate regulation 43 in the full-open state, as shown in FIG. 3, in order to prevent a quantity of cold air from entering the refrigerant car exterior heat exchanger 12 during travel.

By arranging the invention in such a way, the refrigerant car exterior heat exchanger 12 can be defrosted easily, as the cold air does not enter there, and there will be no problem of performance deterioration of the refrigerant car exterior heat exchanger 12.

Though not shown, the second opening and closing duct for air inflow rate regulation 44 is not particularly specified; it is preferable to let the movable louvers 46 be, for example, in the full-close, half-open or full-open state.

Next, other methods for defrosting frost deposited on the refrigerant car exterior heat exchanger 12 as mentioned above are discussed.

In the case of defrosting frost deposited on the refrigerant car exterior heat exchanger 12, the movable louvers 46 of the first opening and closing duct for air inflow rate regulation 43 are controlled to close and, at the same time, the movable louvers 46 of the second opening and closing duct for air inflow rate regulation 44 are positioned to be in a full-open state, and the speed of rotation of the fan 42 is reduced by rotating the fan 42 in the reverse direction so as to send the air used for cooling the engine 41, which has increased in temperature, through the refrigerant car exterior heat exchanger 12.

Though not shown, in the case of hybrid cars that use electricity and gasoline as their energy source, idle stop coping cars or the like, the air used for cooling a driving motor or a motor driving circuit, which has increased in temperature, is sent through the refrigerant car exterior heat exchanger 12.

By arranging the invention in such a way, the increased-temperature air makes defrosting easier, and there will be no problem of performance deterioration of the refrigerant car exterior heat exchanger 12. Next, other methods for defrosting frost deposited on the refrigerant car exterior heat exchanger 12 shall be described.

In the case of defrosting frost deposited on the refrigerant car exterior heat exchanger 12, the movable louvers 46 of the first opening and closing duct for air inflow rate regulation 43 are controlled to close and the fan 42 is stopped. The movable louvers 46 of the second opening and closing duct for air inflow rate regulation 44 are not particularly specified, and can be positioned, for example, in the full-close, half-open or full-open state.

By arranging the invention in such a way, the refrigerant car exterior heat exchanger 12 can be defrosted easily, as the cold air does not enter there, and there will be no problem of performance deterioration of the refrigerant car exterior heat exchanger 12.

Figure 4:
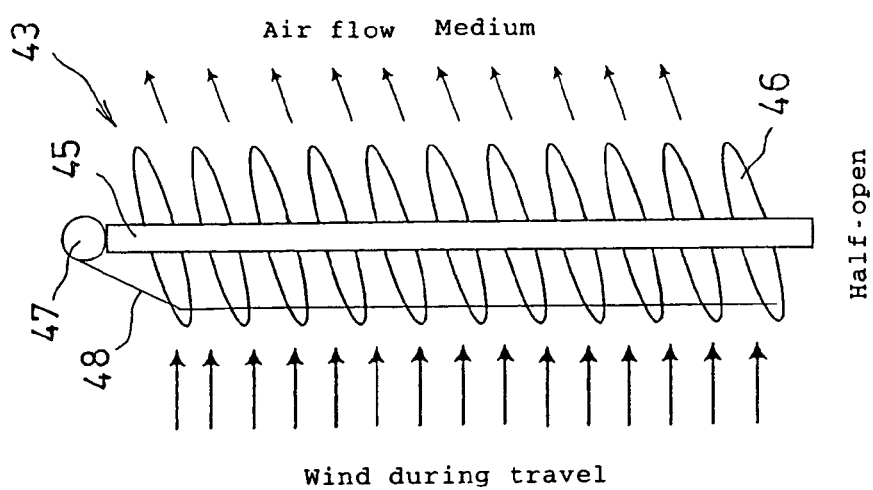
FIG. 4 is an illustrative drawing for schematically describing another use example of the opening and closing duct for air inflow rate regulation used in the present invention shown in FIG. 2.

Furthermore, in the case of driving a vehicle 40 in traffic congestion during a hot summer time or the like, by using the refrigeration circuit for cooling, as shown in FIG. 4, the movable louvers 46 of the first opening and closing duct for air inflow rate regulation 43 are positioned to the half-open state for setting the air inflow rate to the medium level. By setting the air inflow rate to the medium level, the deterioration of the cooling capacity of the refrigerant car exterior heat exchanger 12 can be controlled or prevented by deterring air, which has been heated to a high temperature by heat from the road surface in asphalt or concrete or the exhaust heat from vehicles traveling ahead, from flowing in the refrigerant car exterior heat exchanger 12. The deterioration of refrigeration efficiency of the refrigerant car exterior heat exchanger 12 can be controlled or prevented by blocking most of the radiation heat from the engine 41 (or from a driver such as a motor (not shown)) also by positioning the movable louvers 46 of the second opening and closing duct for air inflow rate regulation 44 to the half-open state.

Figure 5:
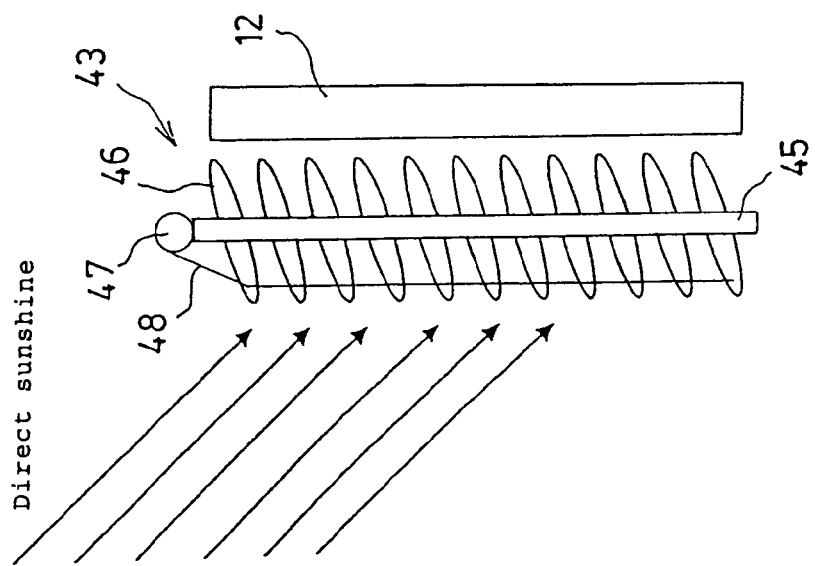
FIG. 5 is an illustrative drawing for schematically describing another use example of the opening and closing duct for air inflow rate regulation used in the present invention shown in FIG. 2.
Figure 6:
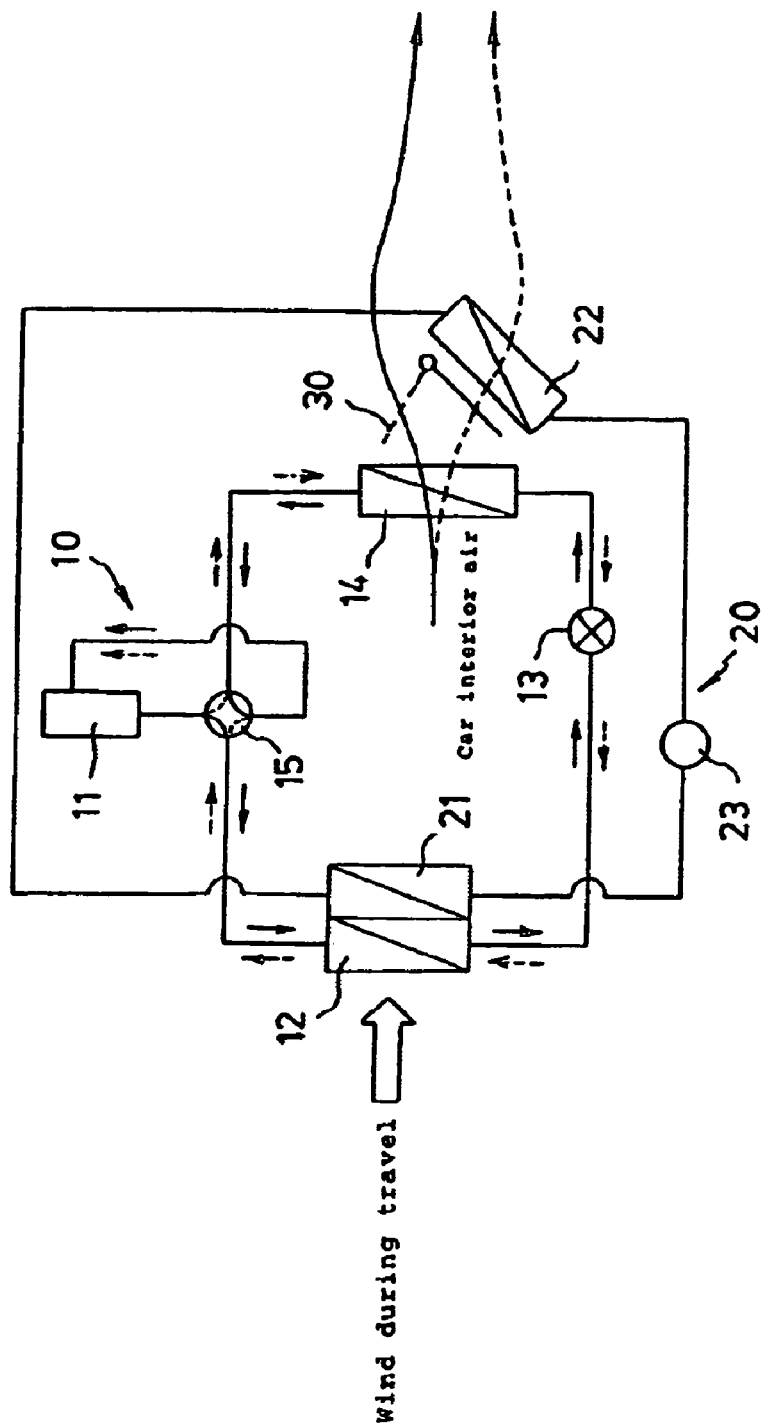
FIG. 6 is an illustrative drawing showing the composition of an on-vehicle air-conditioner of the prior art.

Also, when the vehicle 40 is traveling using the refrigeration circuit for cooling during a summer high temperature time or the like, if the refrigerant car exterior heat exchanger 12 is exposed to intense direct sunshine and heated, which acts adversely on the heat exchange, as shown in FIG. 5, the influence of the sunshine can be reduced by positioning the movable louvers 46 of the first opening and closing duct for air inflow rate regulation 43 approximately to the half-open state.

Furthermore, the deterioration of refrigeration efficiency of the refrigerant car exterior heat exchanger 12 can be controlled or prevented by blocking most of the radiation heat from the engine 41 by also positioning the movable louvers 46 of the second opening and closing duct for air inflow rate regulation 44 to the half-open state, for example.

Especially in the case of using $CO_2$ as a refrigerant, the car interior sometimes cannot be cooled sufficiently, if the deterioration of refrigeration efficiency of the refrigerant car exterior heat exchanger 12 due to the heat from the road surface in asphalt or concrete or the exhaust heat from vehicles traveling ahead, radiation heat from an engine, or intense sunshine increases the refrigerant temperature and lowers the refrigerating capacity; however, the use of the on-vehicle air-conditioner for air-conditioning permits a satisfactory cooling of the car interior even in the case of using $CO_2$ as a refrigerant.

It should be appreciated that the description of the aforementioned embodiments is only illustrative of the present invention and is not intended to limit the invention described to what is claimed, nor reduce the scope. Moreover, the composition of respective parts of the present invention is not limited to the aforementioned embodiments, but can be modified variously without departing from the technical scope described in the claims.

The on-vehicle air-conditioner for air-conditioning of the present invention is an on-vehicle air-conditioner for air-conditioning including a refrigeration circuit provided with a refrigerant car exterior heat exchanger installed for exchanging heat with the car exterior air that can be used for cooling and for heating, and at least one opening and closing duct for air inflow rate regulation installed in front of and/or behind the refrigerant car exterior heat exchanger. Problems of the prior art can be resolved, and cooling, heating, defrosting or the like can be performed effectively, even in the case of using, for example, $CO_2$ or a hydrocarbon as a refrigerant, in vehicles such as hybrid cars that use electricity and gasoline as their energy source, idle stop coping cars or the like, by controlling conveniently the opening/closing of its opening and closing duct for air inflow rate regulation according to the situation.

In another embodiment of the present invention, at least one of the ducts installed in front of and/or behind the refrigerant car exterior heat exchanger is controlled to close, for defrosting frost deposited on the refrigerant car exterior heat exchanger by using the refrigeration circuit for heating during the travel in winter or the like, having thereby the remarkable effect of deferring cold air from flowing in the refrigerant car exterior heat exchanger during the defrosting and allowing easy defrosting.

In yet another embodiment of the present invention, at least one of the ducts installed in front of and/or behind the refrigerant car exterior heat exchanger is controlled to close, and the air used for cooling the engine, motor or motor driving circuit, which has increased in temperature, is sent, by lowering the speed of rotation through the reverse rotation of the fan, through the refrigerant car exterior heat exchanger, for defrosting frost deposited on the refrigerant car exterior heat exchanger by using the refrigeration circuit for heating during the travel in winter or the like, having thereby the remarkable effect of allowing more easy defrosting.

In still another embodiment of the present invention, at least one of the ducts installed in front of and/or behind the refrigerant car exterior heat exchanger is controlled to close, and the fan is stopped, for defrosting frost deposited on the refrigerant car exterior heat exchanger by using the refrigeration circuit for heating during the travel in winter or the like, having thereby the remarkable effect of deferring cold air from flowing in the refrigerant car exterior heat exchanger during defrosting and allowing easy defrosting.

In a further embodiment of the present invention, at least one of the ducts installed in front of and/or behind the refrigerant car exterior heat exchanger is controlled to be half-open, during the use of the refrigeration circuit for cooling heating during traffic congestion during a hot summer or the like, having thereby the remarkable effect of preventing hot air from flowing so much in the refrigerant car exterior heat exchanger, blocking off the radiation heat of drivers such as the engine, motor or the like, and allowing the car interior to cool sufficiently by controlling or preventing adverse effects by the engine radiation heat, exhaust heat of vehicles traveling ahead, or the like.

In a still further embodiment of the present invention, at least one of the ducts installed in front of and/or behind the refrigerant car exterior heat exchanger is controlled to be half-open, in the case where direct sunshine adversely affects the heat exchange of the refrigerant car exterior heat exchanger, during use of the refrigeration circuit for cooling, having thereby the remarkable effect of reducing the effect of direct sunshine, blocking off the radiation heat of drivers such as the engine, motor or the like and allowing the car interior to cool sufficiently.

In the present invention, the refrigerant can be $CO_2$, having thereby the remarkable effects of low load on the environment, absence of ozone layer destruction effect, combustibility or toxicity and, being extremely friendly to the environment as its global warming potential (GWP) is 1, and in addition, being economical. Further, it has the remarkable effect of controlling the elevation of the refrigerant temperature and assuring a satisfactory cooling of the car interior even when the refrigeration circuit is used for cooling during a hot summer time or the like.

In the present invention, the refrigerant can be a hydrocarbon system refrigerant, having thereby the remarkable effects of low load on the environment, absence of ozone layer destruction effect, combustibility or toxicity and, being extremely friendly to the environment as its global warming potential (GWP) is 1, and in addition, being economical. Further, it has the remarkable effect of controlling the elevation of the refrigerant temperature and assuring a satisfactory cooling of the car interior even when the refrigeration circuit is used for cooling during a hot summer time or the like.

INDUSTRIAL APPLICABILITY

The industrial use value of the on-vehicle air-conditioner for air-conditioning of the present invention, comprising a refrigeration circuit provided with a refrigerant car exterior heat exchanger installed for exchanging heat with the car exterior air that can be used for cooling and for heating, and at least one opening and closing duct for air inflow rate regulation installed in front of and/or behind the refrigerant car exterior heat exchanger, is considerably important, because problems of the prior art can be resolved. Cooling, heating, defrosting or the like can be performed effectively, even in case of using, for example, $CO_2$ or a hydrocarbon as a refrigerant. These functions can be performed effectively in vehicles such as hybrid cars that use electricity and gasoline as their energy source, idle stop coping cars or the like, by controlling conveniently the opening/closing of its opening and closing duct for air inflow rate regulation according to the situation.

What is claimed is:

1. An on-vehicle air-conditioner for air-conditioning a car interior comprising a passenger cabin, comprising:
    a refrigeration circuit operative to cool and to heat the passenger cabin, the refrigeration circuit including a refrigerant flowing in the refrigeration circuit, the refrigerant on a portion of the refrigeration circuit in heat exchange relationship with air in the passenger cabin, the refrigeration circuit further including a heat exchanger disposed in front of an engine within the car shell and exterior to the passenger cabin, the refrigerant flowing in the heat exchanger in heat exchange relationship with exterior air; and
    a first duct installed in front of the heat exchanger, the first duct openable and closable to regulate inflow of exterior air passing over said heat exchanger;
    a second duct installed behind the heat exchanger, the second duct openable and closable to regulate inflow of exterior air passing over said heat exchanger;
    at least one of said first duct and said second duct is controllable to be in a closed state, wherein said refrigeration circuit is operative to defrost frost deposited on said heat exchanger by using the refrigeration circuit for heating when at least one of said first duct and said second duct is in the closed state; and
    a fan controllable to operate at a lower speed of rotation by reverse rotation, the fan reversible flow disposed to direct air that has been heated due to cooling an engine, a motor or a motor driving circuit through said heat exchanger.

2. The on-vehicle air-conditioner for air-conditioning of claim 1, wherein at least one of said first duct and said second duct is controllable to be in a closed state, and the said fan is stopped,
    when said refrigeration circuit is operating to defrost frost deposited on said heat exchanger by using the refrigeration circuit for heating.

3. The on-vehicle air-conditioner for air-conditioning of claim 2, wherein the refrigerant is $CO_2$.

4. The on-vehicle air-conditioner for air-conditioning of claim 2, wherein the refrigerant is a hydrocarbon system refrigerant.

5. The on-vehicle air-conditioner for air-conditioning of claim 1, wherein at least one of said first duct and said second duct is controllable to be in a half-open state, during the use of the refrigeration circuit for cooling.

6. The on-vehicle air-conditioner for air-conditioning of claim 5, wherein the refrigerant is $CO_2$.

7. The on-vehicle air-conditioner for air-conditioning of claim 5, wherein the refrigerant is a hydrocarbon system refrigerant.

8. The on-vehicle air-conditioner for air-conditioning of claim 1, wherein at least one of said first duct and said second duct is controllable to be in a half-open state, when direct sunshine adversely affects the heat exchange of said heat exchanger, during the use of the refrigeration circuit for cooling.

9. The on-vehicle air-conditioner for air-conditioning of claim 8, wherein the refrigerant is $CO_2$.

10. The on-vehicle air-conditioner for air-conditioning of claim 8, wherein the refrigerant is a hydrocarbon system refrigerant.

11. The on-vehicle air-conditioner for air-conditioning of claim 1, wherein the refrigerant is $CO_2$.

12. The on-vehicle air-conditioner for air-conditioning of claim 1, wherein the refrigerant is a hydrocarbon system refrigerant.

* * * * *

UNITED STATES PATENT AND TRADEMARK OFFICE
CERTIFICATE OF CORRECTION

| | |
|---|---|
| PATENT NO. | : 7,066,245 B2 |
| APPLICATION NO. | : 10/258084 |
| DATED | : June 27, 2006 |
| INVENTOR(S) | : Toshiyuki Ebara et al. |

It is certified that error appears in the above-identified patent and that said Letters Patent is hereby corrected as shown below:

Title page, (74), "*Attorney, Agent, or Firm*–Weingarten, Schurgin, Gagnebin & Lebovici KKP" should read --*Attorney, Agent, or Firm*–Weingarten, Schurgin, Gagnebin & Lebovici LLP--;

Column 10, line 5, claim 1, "a fan" should read --a reversible flow fan--; and

Column 10, line 6, claim 1, delete "reversible flow".

Signed and Sealed this

Ninth Day of January, 2007

JON W. DUDAS
*Director of the United States Patent and Trademark Office*